United States Patent
Lim et al.

(12) 
(10) Patent No.: US 6,292,286 B1
(45) Date of Patent: Sep. 18, 2001

(54) PLATE FOR ROTATABLY SUPPORTING A LIGHT PATH REFRACTION PLATE IN MULTI-DIRECTIONS AND AN IMAGE PROCESSING DEVICE EMPLOYING THE SAME

(75) Inventors: Dae-soon Lim, Yongin; Sung-hee Lee; Jong-cheon Kim, both of Suwon, all of (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/527,469

(22) Filed: Mar. 17, 2000

(51) Int. Cl.$^7$ .................................................. G02B 26/08
(52) U.S. Cl. ......................... 359/209; 359/196; 348/335
(58) Field of Search .................................. 359/196–199, 359/209–211, 831, 837; 396/384, 342–346; 348/207, 202, 209, 210, 335

(56) References Cited

U.S. PATENT DOCUMENTS

| 5,315,411 | 5/1994 | Blanding | 358/482 |
| 5,754,226 | 5/1998 | Yamada et al. | 348/219 |

FOREIGN PATENT DOCUMENTS

| 0 689 349 A1 | 12/1995 | (EP) | H04N/5/225 |
| 0 928 104 A2 | 7/1999 | (EP) | H04N/5/225 |

*Primary Examiner*—James Phan
(74) *Attorney, Agent, or Firm*—Sughrue, Mion, Zinn, Macpeak & Seas, PLLC

(57) ABSTRACT

A plate for supporting a light path refraction plate arranged in front of a color coupled device in a manner that the light path refraction plate is rotated in multi-directions, and an image processing device including the plate, which is capable of improving the resolution of the color coupled device by successively projecting lights of an object to a plurality of places on a pixel of the color coupled device. The plate includes a frame for supporting the light path refraction plate, a first holder for rotatably supporting the frame in a second direction, a second holder for rotatably supporting the first holder in a first direction which is in perpendicular relation with respect to the second direction, a first connecting section for connecting the first and second holders, and a second connecting section for connecting the frame and the first holder. The image processing device includes the light path refraction plate, the plate, and the driving section. The light path refraction plate refracts and projects an incident ray from an object to the color coupled device. The driving section drives the light path refraction plate in a manner that the respective lights of the image of the object are successively projected to a predetermined number of places in the respective pixels of the color coupled device. The driving section includes a pair of piezoelectric actuators for rotating the frame and the first holder within a predetermined angular range, and a driving circuit for applying the driving signal to the pair of piezoelectric actuators.

14 Claims, 8 Drawing Sheets

PLATE FOR ROTATABLY SUPPORTING A LIGHT PATH REFRACTION PLATE IN MULTI-DIRECTIONS AND AN IMAGE PROCESSING DEVICE EMPLOYING THE SAME

BACKGROUND OF THE INVENTION

1. Field of the Invention

The present invention relates to a camera, and more particularly, to a plate for supporting a light path refraction plate of an image processing device capable of improving the resolution of a color coupled device by successively projecting lights to a plurality of places on a pixel of the color coupled device, and an image processing device employing the same.

2. Description of the Prior Art

Generally, in a camera such as a still camera or a cam corder adopting a solid state color coupled device, the quality of the photographed image depends on the resolution of the solid state color coupled device. Accordingly, it is preferable to adopt a solid state color coupled device of high resolution in order to get a high quality image.

However, in order to improve the resolution of the solid state color coupled device, many more light receiving elements have to be integrated in a limited area thereof, so the technique for integration should be high. Furthermore, the higher the degree of integration, the smaller the light receiving area becomes, so a light receiving element of higher sensitivity should be used.

Therefore, it is very costly and difficult to design and manufacture a high resolution color coupled device, causing the camera in which it is installed to be expensive.

Various suggestions have been offered to solve the above-mentioned problem, and a few of them are disclosed in Japanese Patent Publication No. 9-172568 (Applicant: CANON), and Japanese Patent Publication No. 63-240185 (Applicant: TOSHIBA).

In order to vary the refractivity of an incident ray of light projected to the color coupled device, JP Publication No. 9-172568 employs four plate glasses of different refractivities and JP Publication No. 63-240185 employs two prisms displaced by four piezoelectric elements, respectively. Accordingly, the incident ray of light to the color coupled device is projected to a plurality of places of the pixel, improving the resolution of the color coupled device.

According to the JP Publication Nos. 9-172568 and 63-240185, however, since the plate glasses or the prisms are supported to be rotated in one direction, a plurality of plate glasses or prisms are required in order to vary the refractivity of the light. Accordingly, the volume thereof increases while the structure is complicated. As a result, the camera employing the same becomes voluminous, and the assembly process becomes difficult. Further, manipulation of the camera is also complicated.

SUMMARY OF THE INVENTION

The present invention has been made to overcome the above-mentioned problems of the prior art, and accordingly it is an object of the present invention to provide a plate for supporting a light path refraction plate to be rotated in multi-directions.

Another object of the present invention is to provide an image processing device for use in a camera having a simple structure, and is easy to assemble.

The above objects are accomplished by a light path refraction plate supporting plate according to the present invention, including: a frame for supporting a light path refraction plate for refracting and projecting an incident ray from an object to a color coupled device; a first holder for rotatably supporting the frame in a second direction; a second holder for rotatably supporting the first holder in a first direction which is in perpendicular relation with respect to the second direction; a first connecting section for connecting the first and second holders; and a second connecting section for connecting the frame and the first holder.

The supporting plate has a predetermined elasticity, and the frame, the first holder, the second holder, the first connecting section, and the second connecting section are made of elastic material and are integrally formed. Further, the first and second connecting sections are in parallel relation with respect to respective rotational axises thereof. The first and second connecting sections may be in the perpendicular relation with respect to respective rotational axises thereof, and be in the shape of the letter I or U.

The above objects are also accomplished by an image processing device including a light path refraction plate, a supporting plate, and a driving section.

The light path refraction plate is arranged in front of the color coupled device, for refracting and projecting incident ray of light from an object to the color coupled device.

The driving section includes a first actuator for rotating the first holder in the first direction, thereby successively projecting respective lights of an image of the object to a predetermined number of places in respective pixels of the color coupled device; and a second actuator for rotating the frame in the second direction. The first and second actuators are bimorphemic piezos, and are in contact with the first holder by first and second operational pieces.

According to the present invention, since one light path refraction plate is supported by the supporting plate and a pair of bimorphemic piezos to be rotated in two directions, the volume is decreased, and the structure is simplified, and the assembly and manipulation thereof become also simplified.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Figure 1A:
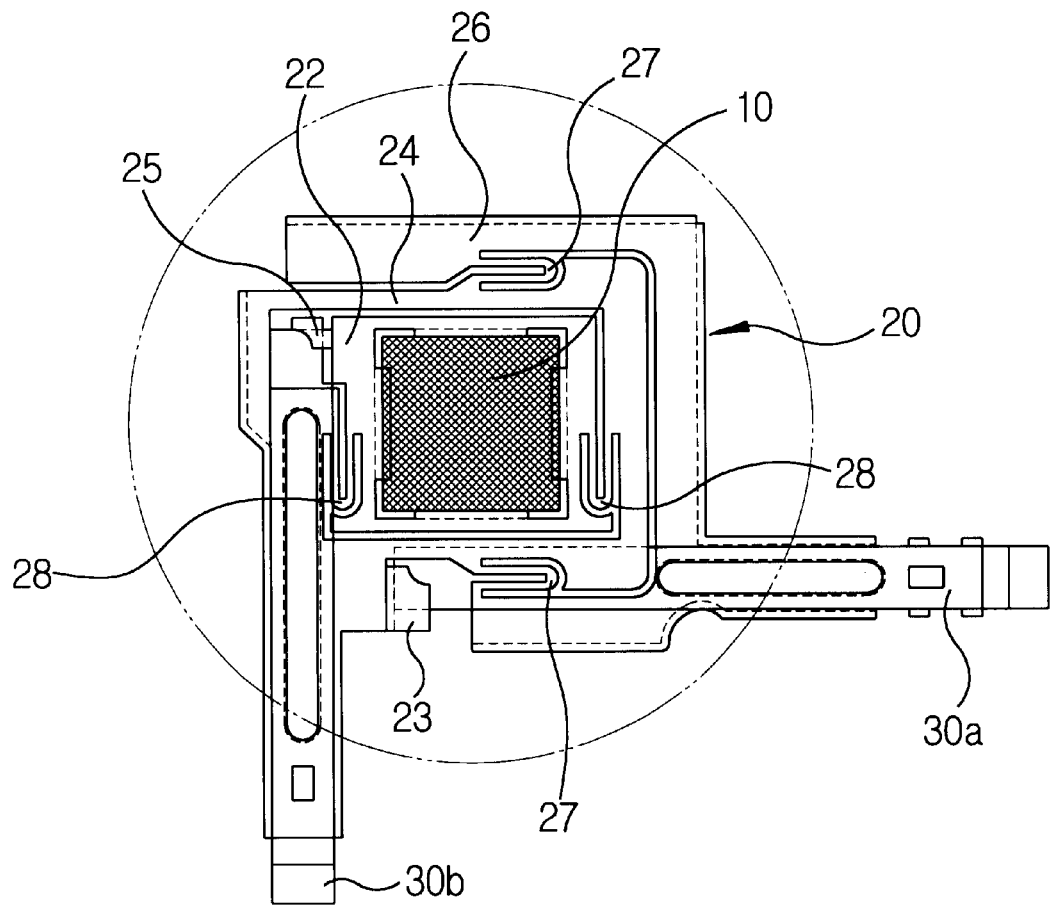
FIG. 1A is a plan view of an image processing device according to a preferred embodiment of the present invention.
Figure 1B:
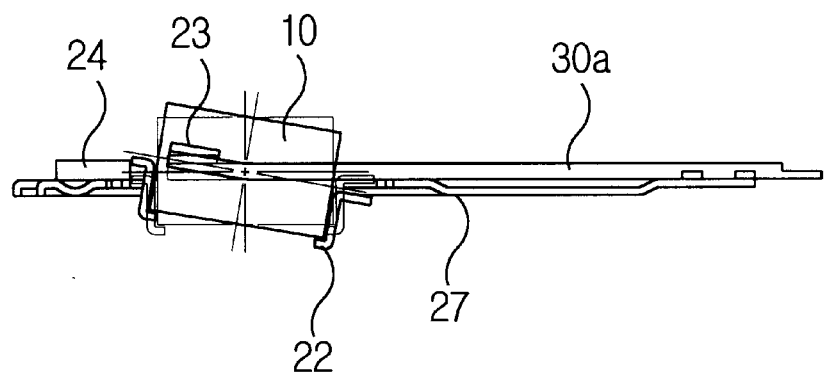
FIG. 1B is a side view of the image processing device of FIG. 1A.

Hereinafter, an image processing device according to the preferred embodiment of the present invention will be described with reference to FIGS. 1A and 1B.

As shown, the image processing device according to the preferred embodiment of the present invention includes a light path refraction plate 10 arranged in front of a color coupled device 4 (see FIG. 5) for refracting and projecting an incident ray from an object to the color coupled device, a supporting plate 20 for supporting the light path refraction plate 10, and a driving section for driving the light path refraction plate 10.

The supporting plate 20 is made of an elastic material of a predetermined elasticity, and includes a frame 22, and first and second holders 24 and 26. The frame 22 supports the light path refraction plate 10, the first holder 24 rotatably supports the frame 22 in a second direction (longitudinal direction in the drawing), and the second holder 26 rotatably supports the first holder 24 in a first direction (horizontal direction in the drawing). The first and second holders 24 and 26, and the frame 22 and the first holder 24 are connected with each other by first and second connecting sections 27 and 28, respectively. The frame 22, the first and second holders 24 and 26, and the first and second connecting sections 27 and 28 are integrally formed by a press.

Figure 2:
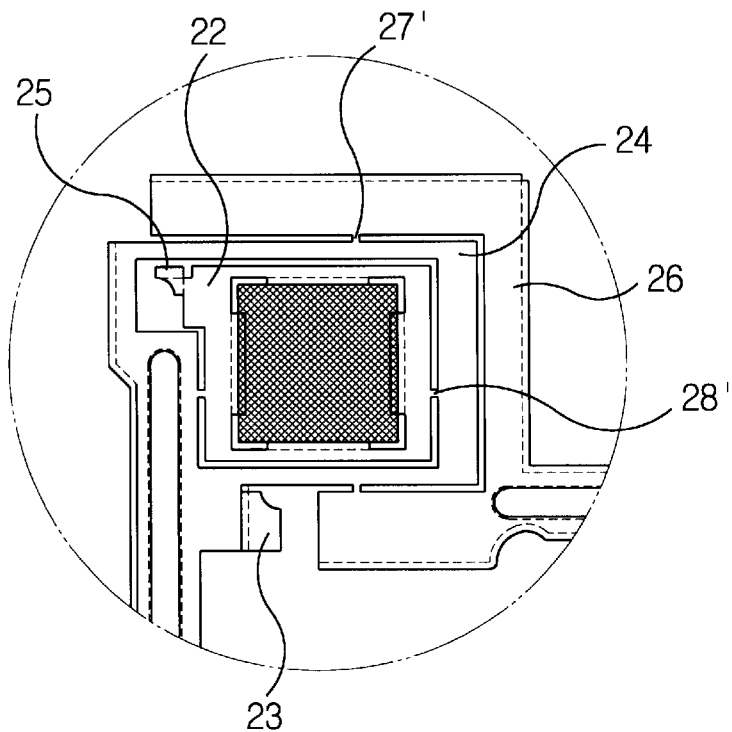
FIG. 2 is a pane view for showing another example of the supporting plate of the image processing device according to the preferred embodiment of the present invention.
Figure 3:
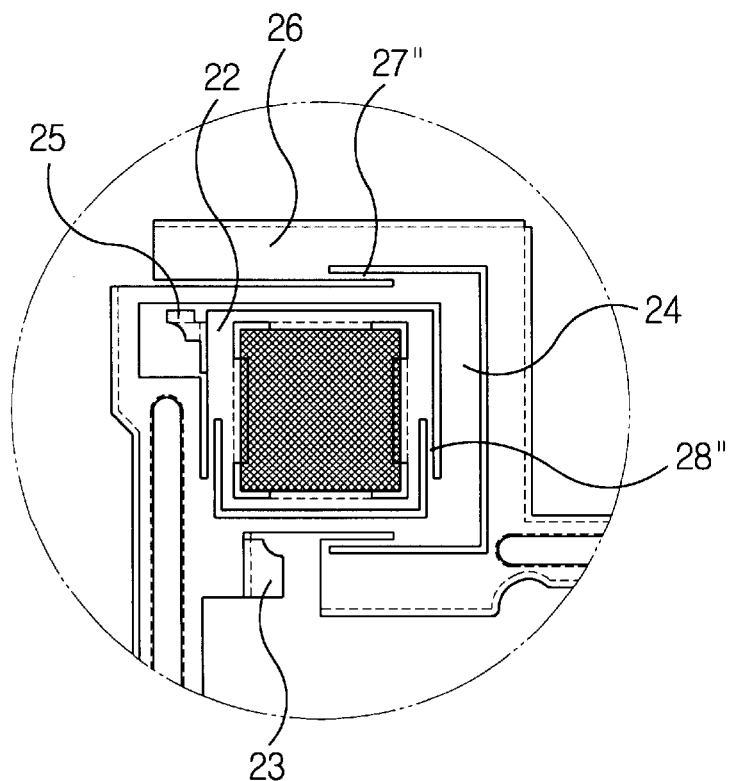
FIG 3 is a plan view for showing still another example of the supporting plate of the image processing device according to the preferred embodiment of the present invention.

As shown in the drawings, the first and second connecting sections 27 and 28 have U-shapes, and are formed in a perpendicular relation with respect to the respective rotational axises of the first holder 24 and the frame 22. Meanwhile, FIGS. 2 and 3 show another example of the supporting plate 20 of the image processing device according to the present invention. In FIG. 2, the first and second connecting sections 27' and 28' are formed in a parallel relation with respect to the respective rotational axises of the first holder 24 and the frame 22. Further, in FIG. 3, the first and second connecting sections 27" and 28" are formed in a perpendicular relation with respect to the first holder 24 and the frame 22, while having I-shapes, not U-shapes. The shape of the connecting sections may be modified properly considering the modulus of elasticity according to the material of the supporting plate 20.

The driving section includes a first bimorphemic piezo 30a for rotating the first holder 24 in the first direction, a second bimorphemic piezo 30b for rotating the frame in the second direction, and a driving circuit for applying driving signals to the first and second bimorphemic piezos 30a and 30b.

The first and second bimorphemic piezos 30a and 30b are fixed on the end of the second holder 26 and on the end of the first holder 24, respectively, in a perpendicular relation with each other. Other ends of the first and second bimorphemic piezos 30a and 30b are in contact with first and second operational pieces 23 and 25 of the first holder 24 and the frame 22, respectively.

Figure 4:
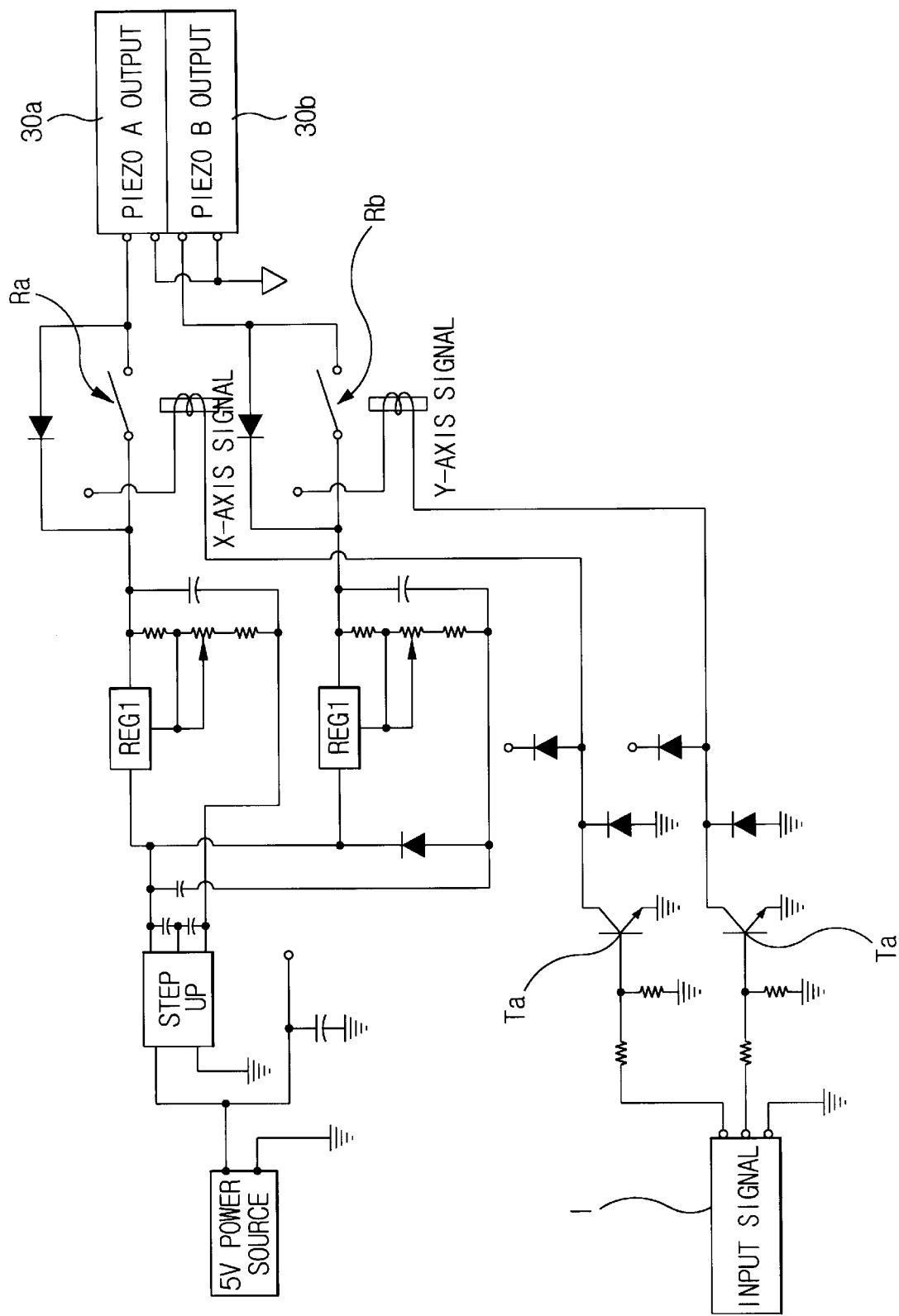
FIG. 4 shows a driving circuit for driving a piezoelectric actuator of the image processing device according to the preferred embodiment of the present invention.

The driving circuit for applying the driving signals to the bimorphemic piezos 30a and 30b is shown in FIG. 4.

According to the operation signal inputted through an input terminal I, transistors Ta and Tb are turned on or off. According to the on/off status of the transistors Ta and Tb, relays Ra and Rb are turned on or off. Accordingly, electricity is applied to the bimorphemic piezo 30a or 30b which is connected with the turned on relay Ra or Rb, and the bimorphemic piezo 30a or 30b is driven.

Figure 5:
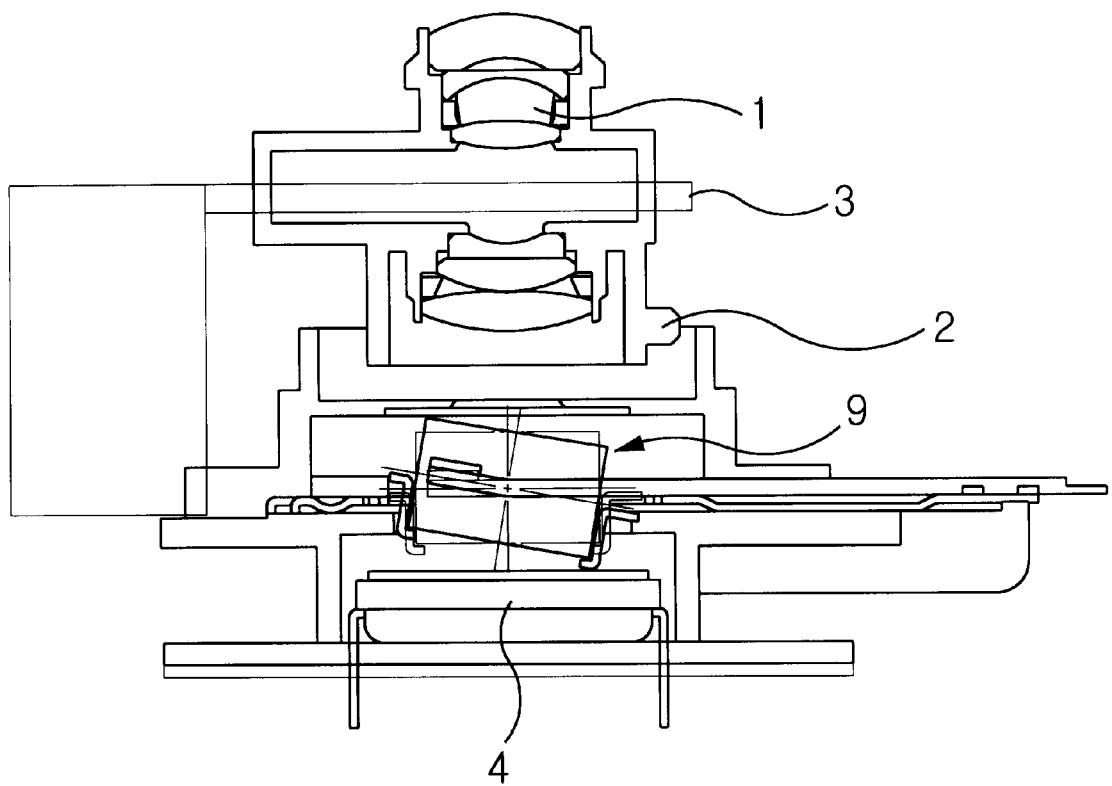
FIG. 5 is a sectional view for showing the image processing device being mounted in a camera according to the preferred embodiment of the present invention.

As shown in FIG. 5, the image processing device according to the preferred embodiment of the present invention is disposed in front of the color coupled device 4 of the camera.

In the camera employing the image processing device according to the present invention, the incident ray of the image of the object through an optical system 1 is projected to the color coupled device 4 via an iris diaphragm 3, and an image processing device 9.

When the operation signal is applied from the driving circuit, end(s) of the first and/or the second bimorphemic piezo(s) 30a and/or 30b is (are) curved. Accordingly, the first and/or second operation piece(s) 23 and/or 25 in contact with the end(s) of the first and/or second bimorphemic piezo(s) 30a and/or 30b is (are) moved, the first holder 24 and/or the frame 22 is (are) rotated on the first and/or second connecting section(s) 27 and/or 28. When the first holder 24 and/or the frame 22 is (are) rotated, the light path refraction plate 10 supported on the frame 10 is rotated in the first and/or the second direction(s) in a predetermined angular range. If the bimorphemic piezo 30a is driven, the light path refraction plate 10 is rotated in the first direction by the first holder 24, while the light path refraction plate 10 is rotated in the second direction by the frame 22 when the second bimorphemic piezo 30b is driven. When both of the first and second bimorphemic piezos 30a and 30b are driven, the light path refraction plate 10 is rotated in both of the first and second directions.

Figure 6:
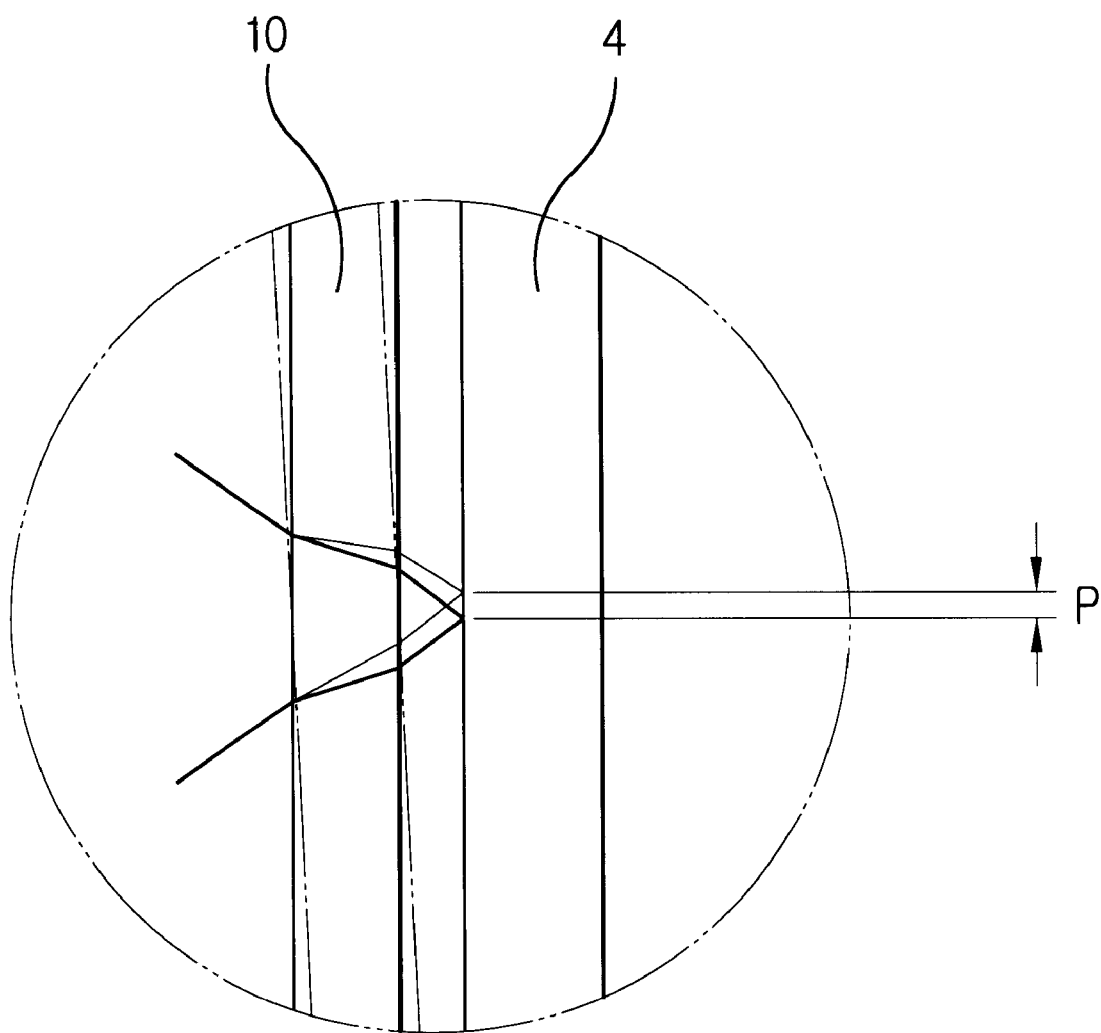
FIG. 6 is an enlarged view for showing the main feature of the present invention, i.e., for showing the operation of the image processing device according to the preferred embodiment of the present invention.

When the light path refraction plate 10 is rotated, as shown in FIG. 6, the incident ray to the color coupled device 4 is refracted by the light path refraction plate 10. Accordingly, the positions of the lights projected to the color coupled device 4 are shifted by a predetermined distance (p). Here, it is preferable that the predetermined angular range of the rotation of the light path refraction plate 10 is the refraction distance of the ray by the light path refraction plate 10 is a half pitch of one pixel when the light path refraction plate 10 is rotated to the maximum extent.

FIGS. 7A to 7D show the example of the image which is projected to the color coupled device 4 through the light path refraction plate 10 of the image processing device constructed as above.

Figure 7A:
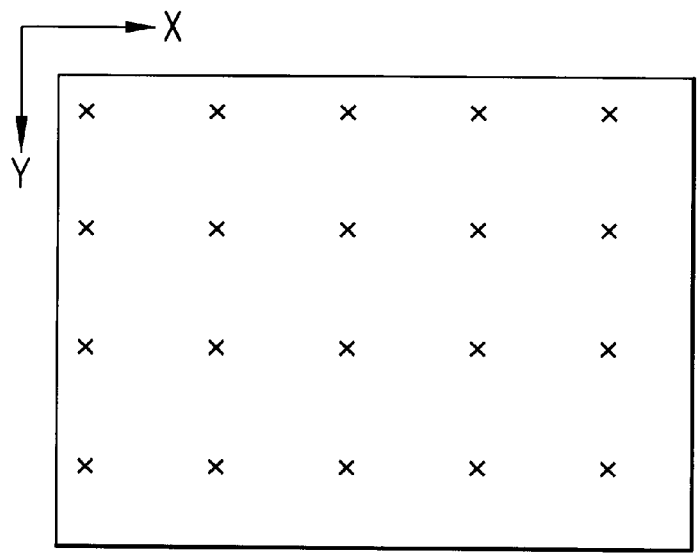
FIG. 7A shows an image of an object projected to a color coupled device when the light path fraction plate of the image processing device according to the preferred embodiment of t present invention is in the initial state.
Figure 7B:
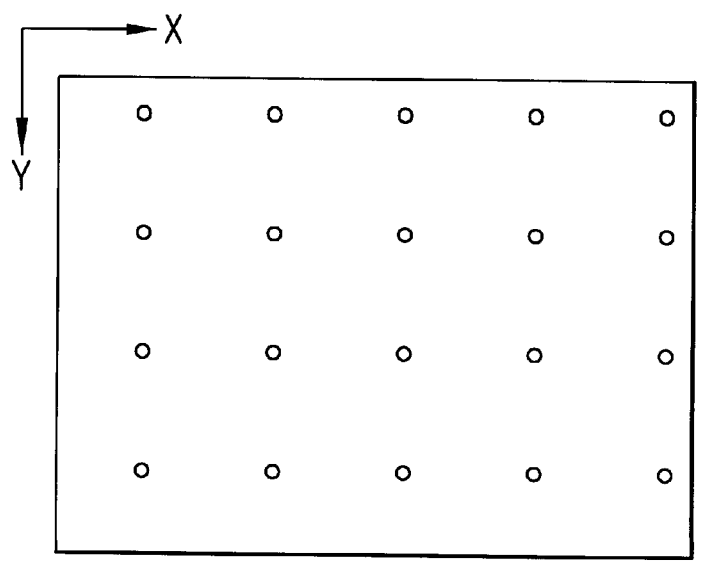
FIG. 7B shows the image of the object being moved by a half pitch in a first direction by the light path refraction plate of the image processing device according to the preferred embodiment of the present invention.
Figure 7C:
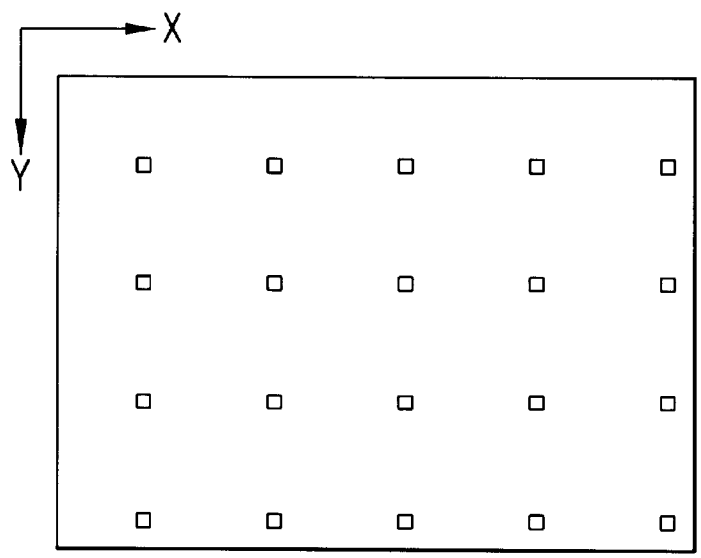
FIG. 7C shows the image of the object being moved by a half pitch both in first and second directions by the light path refraction plate of the image processing device according to the preferred embodiment of the present invention.
Figure 7D:
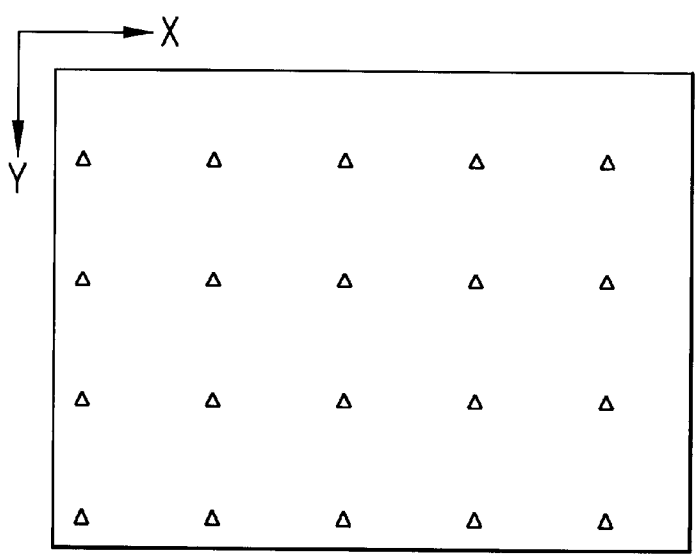
FIG. 7D shows the image of the object being moved by a half pitch in a second direction the light path refraction plate of the image processing device according to the preferred embodiment of the present invention.

FIG. 7A shows the image being projected to the color coupled device 4 when the light path refraction plate 10 is in its initial position. Then as the light path refraction plate 10 is rotated in the first direction, the image of the object is shifted by a half pitch in an X-direction shown in FIG. 7B. Then, as the light path refraction plate 10 is rotated in the second direction, the image of the object is shifted by a half pitch in an Y-direction as shown in FIG. 7C. When the light path refraction plate 10 is reverse rotated in the first direction, the image of object is shifted by a minus half pitch in an X-direction as shown in FIG. 7D. Finally, when the light path refraction plate 10 is reversely rotated in the second direction, the image of the object is shifted by a minus half pitch in the Y-direction, i.e., the image is returned to the initial position.

Figure 8:
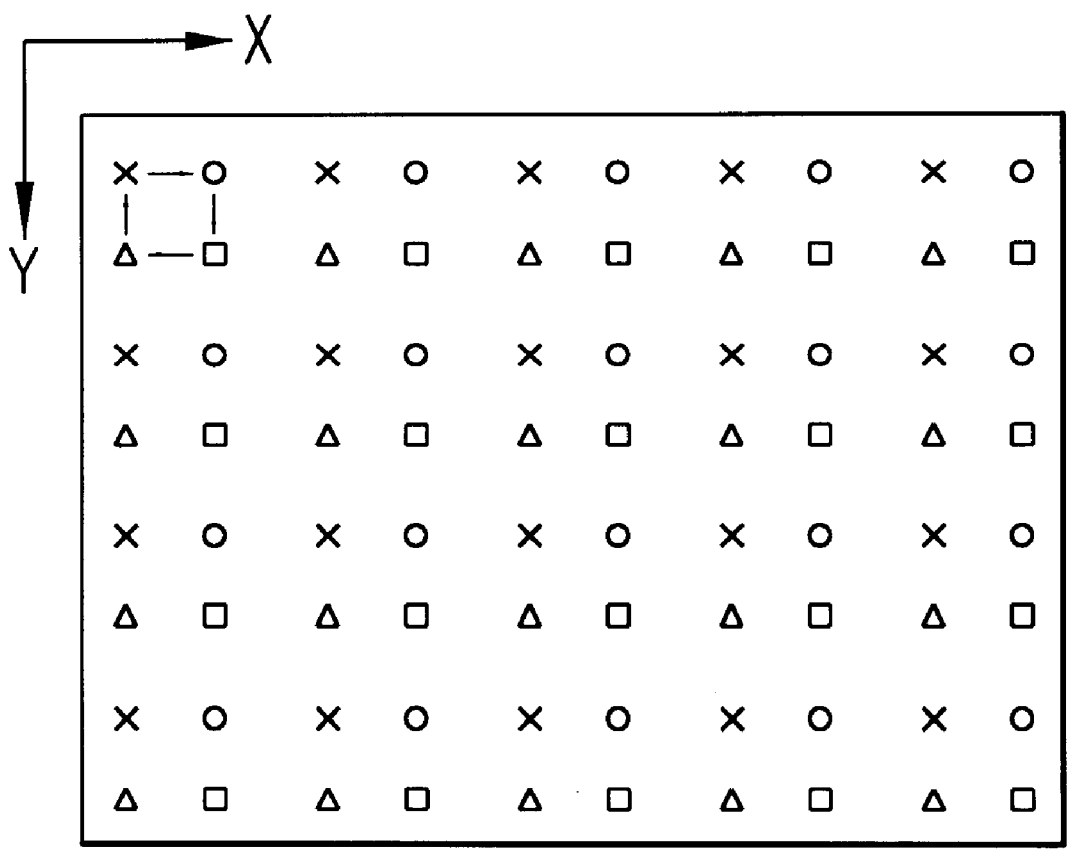
FIG. 8 is a view for showing the images of FIGS. 7A to 7D being composited.

By the above processes, the images of the object on the respective positions as shown in FIGS. 7A to 7D are obtained, and composited to the finalized image as shown in FIG. 8. The image shifting distance by the rotation of the light path refraction plate 10 corresponds to the half pitch of the color coupled device 4, and the lights of the respective images occupy a quarter of one pixel. Accordingly, by compositing four images, one finalized image is obtained, and this finalized image has a resolution which is four times higher than the resolution of the color coupled device 4.

As described above, according to the present invention, one light path refraction plate is supported by the supporting plate to be rotated in two directions, and is rotated by a pair of bimorphemic piezos in two directions. Accordingly, by having a simpler structure and reduced volume, the assembly and operation procedures become simplified. As a result, a camera employing the solid state color coupled device can be compact sized.

As stated above, the preferred embodiment of the present invention is shown and described. Although the preferred embodiment of the present invention has been described, it is understood that the present invention should not be limited to this preferred embodiment but various changes and modifications can be made by one skilled in the art within the spirit and scope of the present invention as hereinafter claimed.

What is claimed is:

1. A light path refraction plate supporting plate comprising:
   a frame for supporting a light path refraction plate for refracting and projecting an incident ray from an object to a color coupled device;
   a first holder for rotatably supporting the frame in a second direction;
   a second holder for rotatably supporting the first holder in a first direction which is in perpendicular relation with respect to the second direction;
   a first connecting section for connecting the first and second holders; and
   a second connecting section for connecting the frame and the first holder.

2. The plate as claimed in claim 1, wherein the frame, the first holder, the second holder, the first connecting section, and the second connecting section are made of elastic material and are integrally formed.

3. The plate as claimed in claim 1, wherein the frame, the first holder, the second holder, the first connecting section, and the second connecting section are made of elastic material and are formed by a press.

4. The plate as claimed in claim 1, wherein the first and second connecting sections are in parallel relation with respect to respective rotational axises thereof.

5. The plate as claimed in claim 1, wherein the first and second connecting sections are in the perpendicular relation with respect to respective rotational axises thereof.

6. The plate as claimed in claim 5, wherein the first and second connecting sections are in the shape of the letter U.

7. The plate as claimed in claim 5, wherein the first and second connecting sections are in the shape of the letter I.

8. An image processing device comprising:
   a light path refraction plate disposed in front of a color coupled device, for refracting and projecting an incident ray from an object to the color coupled device;
   an elastic plate including a frame for supporting the light path refraction plate, a first holder for rotatably supporting the frame in a second direction, a second holder for rotatably supporting the first holder in a first direction which is in perpendicular relation with respect to the second direction, a first connecting section for connecting the first and second holders, and a second connecting section for connecting the frame and the first holder;
   a first actuator for rotating the first holder in the first direction, thereby successively projecting respective lights of an image of the object to a predetermined number of places in respective pixels of the color coupled device; and
   a second actuator for rotating the frame in the second direction, thereby successively projecting respective lights of the image of the object to a predetermined number of places in respective pixels of the color coupled device.

9. The image processing device as claimed in claim 8, wherein the frame, the first holder, the second holder, the first connecting section, and the second connecting section are integrally formed.

10. The image processing device as claimed in claim 8, wherein the first and second actuators are bimorphemic piezos, and are in contact with the first holder and the frame by first and second operational pieces.

11. The image processing device as claimed in claim 8, wherein the first and second connecting sections are in parallel relation with respect to respective rotational axises thereof.

12. The image processing device as claimed in claim 8, wherein the first and second connecting sections are in the perpendicular relation with respect to respective rotational axises thereof.

13. The image processing device as claimed in claim 12, wherein the first and second connecting sections are in the shape of the letter U.

14. The image processing device as claimed in claim 12, wherein the first and second connecting sections are in the shape of the letter I.

* * * * *